P. C. WORTMAN.
Assignor, by mesne assignments, to the ASHTON VALVE Co.
Feed-Water Heater.
No. 8,216. Reissued May 7, 1878.
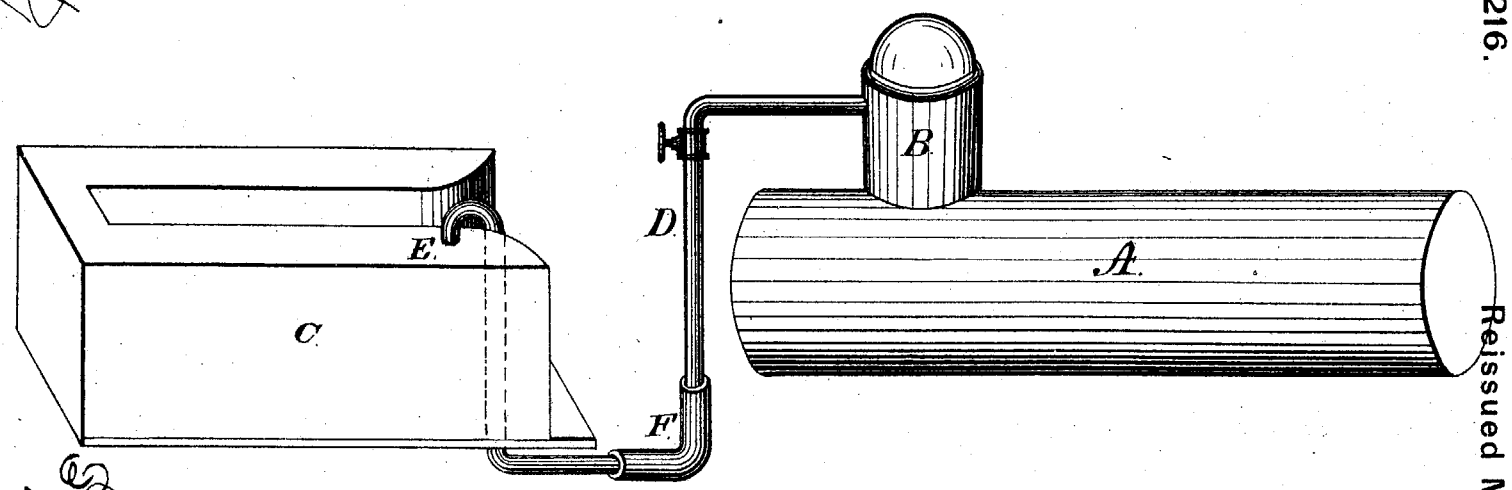
Attest:
D. G. Stuart
F. P. Brock.
Inventor:
Peter C. Wortman
per
A. McCallum
Attorney.
N. PETERS, PHOTO-LITHOGRAPHER, WASHINGTON, D. C.

UNITED STATES PATENT OFFICE.

PETER C. WORTMAN, OF GREENVILLE, MICH., ASSIGNOR, BY MESNE ASSIGNMENTS, TO THE ASHTON VALVE COMPANY, OF HARTFORD, CONN.

IMPROVEMENT IN FEED-WATER HEATERS.

Specification forming part of Letters Patent No. 93,790, dated August 17, 1869; Reissue No. 8,216, dated May 7, 1878; application filed April 13, 1878.

*To all whom it may concern:*

Be it known that I, PETER C. WORTMAN, of the city of Greenville, in the county of Montcalm and State of Michigan, have invented certain new and useful Improvements in Feed-Water Heaters; and I do hereby declare that the following is a full, clear, and exact description of my invention, that will enable others skilled in the art to which it appertains to make and use the same, reference being had to the accompanying drawing, and to the letters of reference marked thereon, which form a part of this specification.

The object of my invention is as follows, to wit: It is a well-known fact that when a locomotive stops at a station, it has to blow off the surplus steam through the safety-valve; also, when ascending a grade with high steam, when the summit is attained, and the car commences to descend a down-grade, the surplus steam is blown off, and is all wasted, while in cold weather the water freezes in the tank. My invention is intended to use this waste steam in heating the water in the tank.

In the drawing, A represents a locomotive-boiler; B, the dome of the same; C, the water-tank on the tender. D E is a tube or pipe, with a flexible joint of rubber, at F. This pipe empties into the water at E, and through this pipe the waste steam passes into the water-tank C, heating the water. This may be controlled by suitable stop-cocks in the pipe, where the same is required.

The operation is as follows: When the locomotive is at a stand, and the pressure of steam in the boiler reaches a degree when it will ordinarily force open the safety-valve, the engineer turns the cock on the pipe D, and allows the steam to pass to the feed-water-tank, thereby saving the steam which would otherwise be wasted, and heating the water in the tank.

In descending grades, or when the steam is not otherwise required, it may be utilized in the same manner.

The flexible joint F, which connects the pipes D and E between the locomotive and the tender, allows for the requisite degree of oscillation or lateral and vertical play consequent on the movement over curves, &c., so that the communication between the pipes D and E will always be maintained.

What I claim as my invention is—

1. The herein-described feed-water-heating apparatus, consisting of the combination of the tank C, pipe E, coupling F, pipe D, and the steam-space of the boiler, substantially as and for the purpose specified.

2. The combination of the tender-pipe E, leading into the water-tank, for the conveyance of steam, with the pipe D, leading into the dome or steam-space of the boiler, and the flexible connection or joint F between the tender and locomotive, substantially as and for the purpose specified.

In testimony that I claim the foregoing I have hereunto set my hand this 30th day of March, 1878.

PETER C. WORTMAN.

Witnesses:

WILLIAM E. HOYT,

H. G. ASHTON.